United States Patent [19]

Berni

[11] Patent Number: 5,046,057
[45] Date of Patent: Sep. 3, 1991

[54] MARINE STREAMER CABLE

[75] Inventor: Albert J. Berni, Houston, Tex.

[73] Assignee: Shell Oil Company, Houston, Tex.

[21] Appl. No.: 448,541

[22] Filed: Dec. 10, 1982

[51] Int. Cl.⁵ .......................................... H04R 15/00
[52] U.S. Cl. ................................................... 367/170
[58] Field of Search .................... 367/15–20, 367/152–154, 170

[56] References Cited

U.S. PATENT DOCUMENTS

| | | | |
|---|---|---|---|
| 2,738,488 | 3/1956 | MacKnight | 367/20 X |
| 3,434,104 | 3/1969 | Stapleton et al. | 367/154 |
| 3,480,907 | 11/1969 | King | 367/154 |
| 3,531,760 | 9/1970 | Whittfill, Jr. | 367/154 X |
| 3,696,329 | 10/1972 | Hazelhurst | 367/154 |
| 3,739,326 | 6/1973 | Kerr et al. | 340/7 R |
| 3,781,778 | 12/1973 | Sawin et al. | 367/152 |
| 3,893,065 | 7/1975 | Lea et al. | 367/152 |
| 3,978,446 | 8/1976 | Miller | 367/170 X |
| 4,183,010 | 1/1980 | Miller | 367/154 |
| 4,402,069 | 8/1983 | Miller et al. | 367/154 |
| 4,477,887 | 10/1984 | Berni | 367/20 |
| 4,510,588 | 4/1985 | Kruka et al. | 367/165 |
| 4,517,665 | 5/1985 | De Reggi et al. | 367/170 |
| 4,536,862 | 8/1985 | Sullivan et al. | 367/153 |

Primary Examiner—Brian S. Steinberger

[57] ABSTRACT

A marine seismic cable comprising a core, a body of flotation material positioned around the core, an acoustic energy transducer positioned proximate the core, and a body of acoustically transparent material positioned around the acoustic energy transducer.

1 Claim, 3 Drawing Sheets

MARINE STREAMER CABLE

BACKGROUND OF THE INVENTION

This invention relates generally to seismic exploration of substrata beneath bodies of water and, more particularly, to a marine seismic cable for sensing reflected seismic waves from such substrata.

Marine seismic exploration is often conducted by towing a seismic streamer at a given depth through the ocean or other body of water. The streamer is provided with a plurality of acoustic sensitive transducers, that is hydrophones, disposed at appropriate intervals along the length thereof. Acoustic wave energy is provided in the vicinity of the cable by an air gun or other suitable means; this wave energy travels downwardly through the earth with a portion of it being reflected upwardly at levels where there is a contrast in the acoustic impedance of the strata. The hydrophones sense the acoustic pressure waves produced in the water by the upwardly traveling seismic reflections and provide electrical signals indicative thereof to suitable processing and recording equipment located on the seismic vessel that is towing the streamer.

The magnitude of the reflected signals is extremely small, thus making it essential to minimize extraneous noise detected by the hydrophones and to maximize the signal-to-noise ratio. One source of such noise is boundary layer or flow noise which is generated by the water flowing past the surface of the cable in a turbulent fashion. It has been found that flow noise is essentially a localized pressure disturbance which is normal to the surface of the cable.

Therefore, it is an object of the present invention to provide a marine seismic cable that reduces the flow noise sensed by a hydrophone mounted in the cable.

SUMMARY OF THE INVENTION

The present invention relates to a marine seismic cable of layered solid construction having a core and a body of flotation material positioned around the core. Acoustic energy transducers, such as cylindrical hydrophones or electret hydrophones, are positioned proximate the core. A body of acoustically transparent material is positioned around the hydrophones so that the acoustic pressure waves produced in the water by the seismic reflections are transmitted therethrough to the hydrophones. The wavelengths of the seismic pressure waves are long compared to the length of a hydrophone so that essentially the entire length of the hydrophone is subjected to the same pressure. However, the flow noise consists essentially of a plurality of uncorrelated point sources exterior of the cable. The effective aperture of a hydrophone positioned near the cable core, that is, the area on the cable surface in which signals can be sensed, provides a relatively large sampling area compared to the prior art teachings of a hydrophone positioned near the surface of the cable. It has been found that when the uncorrelated point sources of flow noise are averaged over this larger area the point sources tend to add non-coherently; whereas, the desired seismic signal adds coherently thus resulting in an improved signal-to-noise ratio. Moreover, positioning the hydrophone near the core removes the hydrophone from the immediate location of the noise source so that the noise signal is attenuated when it reaches the hydrophone.

In the preferred embodiment of the invention, the body of acoustically transparent material that is positioned over the hydrophone is the same material as the flotation body. In addition, a body of elastic material is positioned between the core and the hydrophone to decouple or insulate the hydrophone from noises propagated along the core; this elastic body also centers the cylindrical hydrophones on the cable core.

Other objectives, advantages and applications of the present invention will be made apparent by the following detailed description of the preferred embodiments of the present invention.

DETAILED DESCRIPTION OF THE PREFERRED EMBODIMENTS

Figure 1:
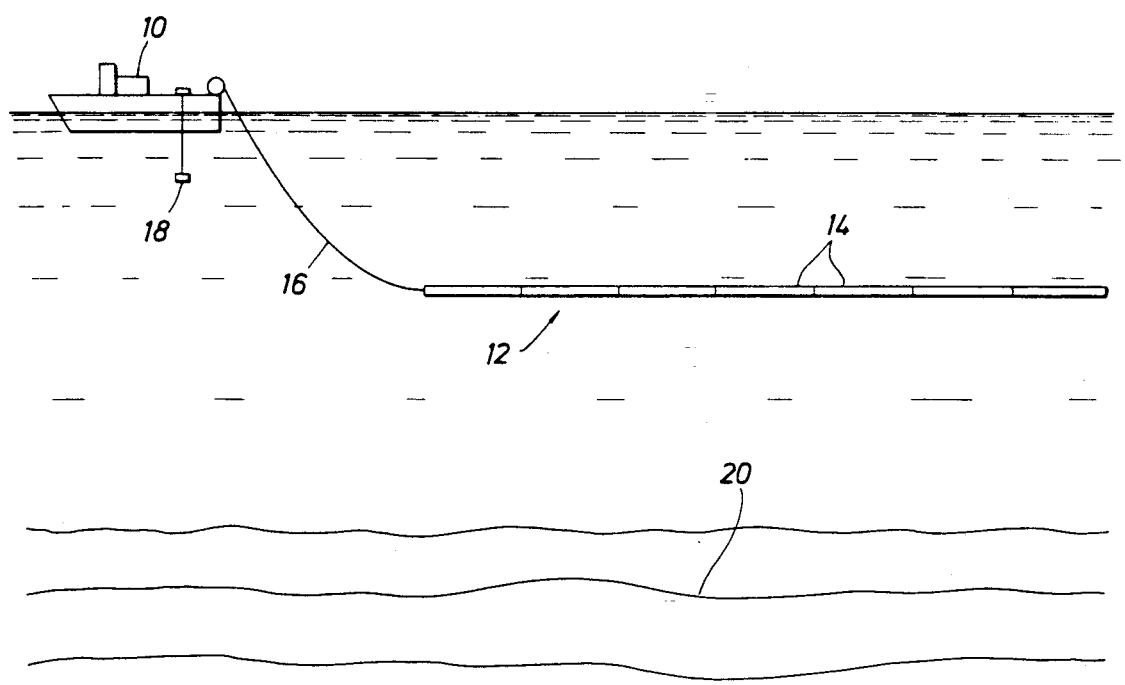
FIG. 1 is a diagrammatic view of a seismic survey utilizing a marine seismic cable that is towed through the water behind a seismic vessel.

Referring to FIG. 1, a seismic exploration vessel 10 is shown towing a marine streamer cable 12 through a body of water located above the substrata that is to be seismically explored. Cable 12 can be quite lengthy, for example, about 2 miles, and is normally composed of a number of individual sections 14 connected end to end. The forward section of cable 12 is connected to vessel 10 by a typical lead-in section 16. Each section 14 contains a number of hydrophones (not shown) that are positioned and electrically connected to form an array as is known in the art. Acoustic wave energy is provided in the vicinity of cable 12 by an air gun 18 or other suitable means. This wave energy travels downwardly through the earth with a portion of it being reflected upwardly at levels where there is a contrast in the acoustic impedance between layers of the strata, for example at point 20. The hydrophones sense the acoustic pressure waves produced in the water by the upwardly traveling seismic reflections.

Figure 2:
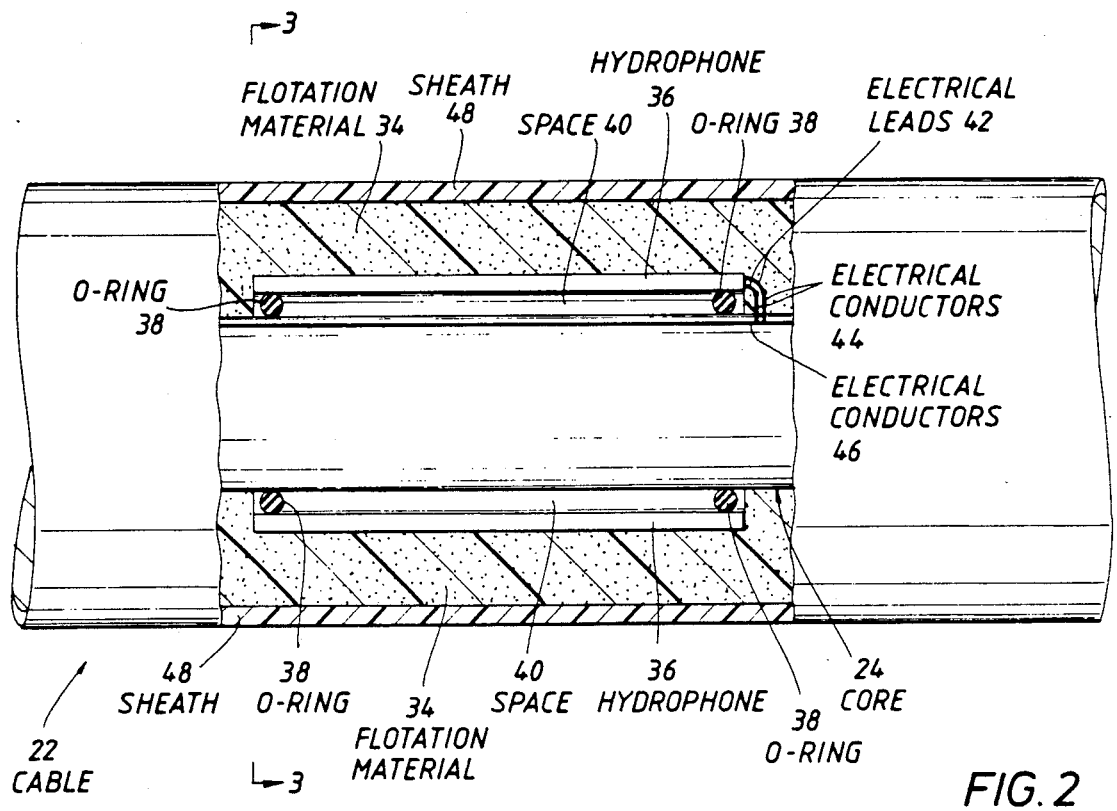
FIG. 2 is a sectional view in side elevation of a marine seismic cable according to the present invention.
Figure 3:
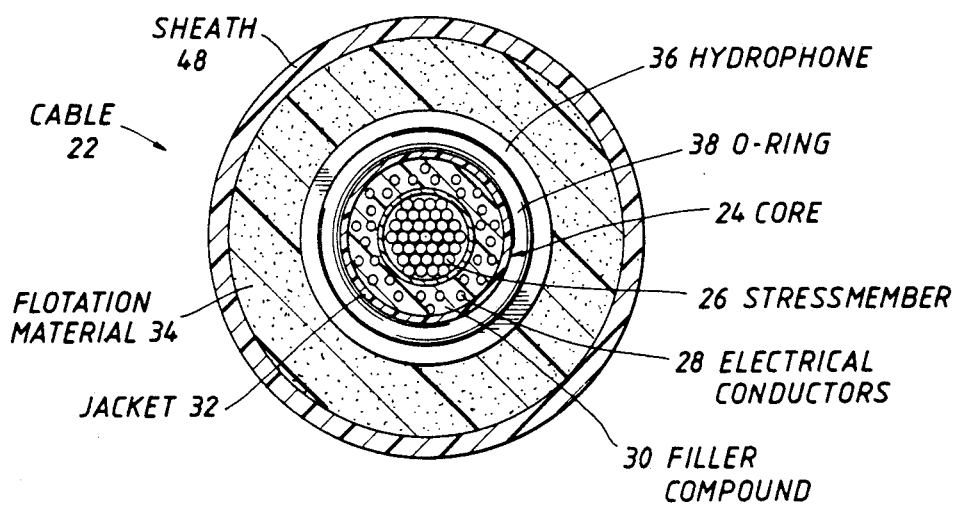
FIG. 3 is a cross section taken along line 3—3 of FIG. 2.

Referring to FIGS. 2 and 3, a section of a marine seismic cable according to the present invention is indicated generally by the numeral 22. Cable 22 has a core 24 which consists of a stress member 26, which can be a flexible steel cable or a synthetic fiber rope, and a plurality of electrical conductors 28 disposed around stress member 26. The voids between conductors 28 are filled with a suitable filler compound 30, and a jacket 32 of urethane or other suitable material is extruded over the outer portion of conductors 28 and filler 30. Core 24 is disposed axially within a cylindrical body of flotation material 34, such as soft urethane having embedded glass or plastic microspheres or balloons, to provide the desired buoyancy.

At discrete locations along cable 22 a cylindrical hydrophone 36 is positioned around core 24. O-rings 38 are positioned at each end of hydrophone 36 between core 24 and hydrophone 36. If desired, elastic material, such as soft urethane, can be positioned in space 40 between core 24, hydrophone 36 and O-rings 38. Alternatively, O-rings 38 can be replaced by a layer of elastic material, such as soft urethane, on core 24 that covers substantially the entire length of hydrophone 36.

Electrical leads 42 from hydrophone 36 are connected in a suitable manner to a pair of electrical conductors 44 from the set of electrical conductors 46 provided by the termination (not shown) of the cable section. Preferably, the portion of flotation material 34 that is positioned around hydrophone 36 has the same outside diameter as the portion of flotation material 34 that is positioned around core 24 to provide a smooth exterior surface. A sheath 48 of, for example, polyurethane plastic, is extruded over flotation material 34 to provide a relatively smooth and damage resistant outer surface.

Figure 4:
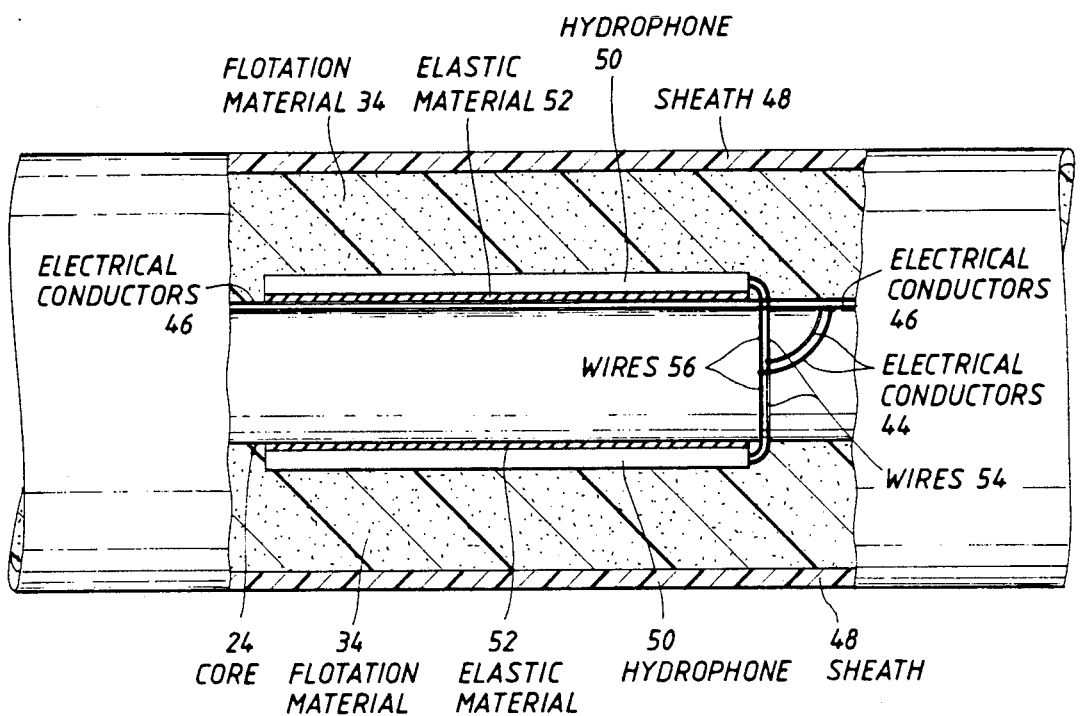
FIG. 4 is a sectional view in side elevation of a second embodiment of the present invention employing electret hydrophones.
Figure 5:
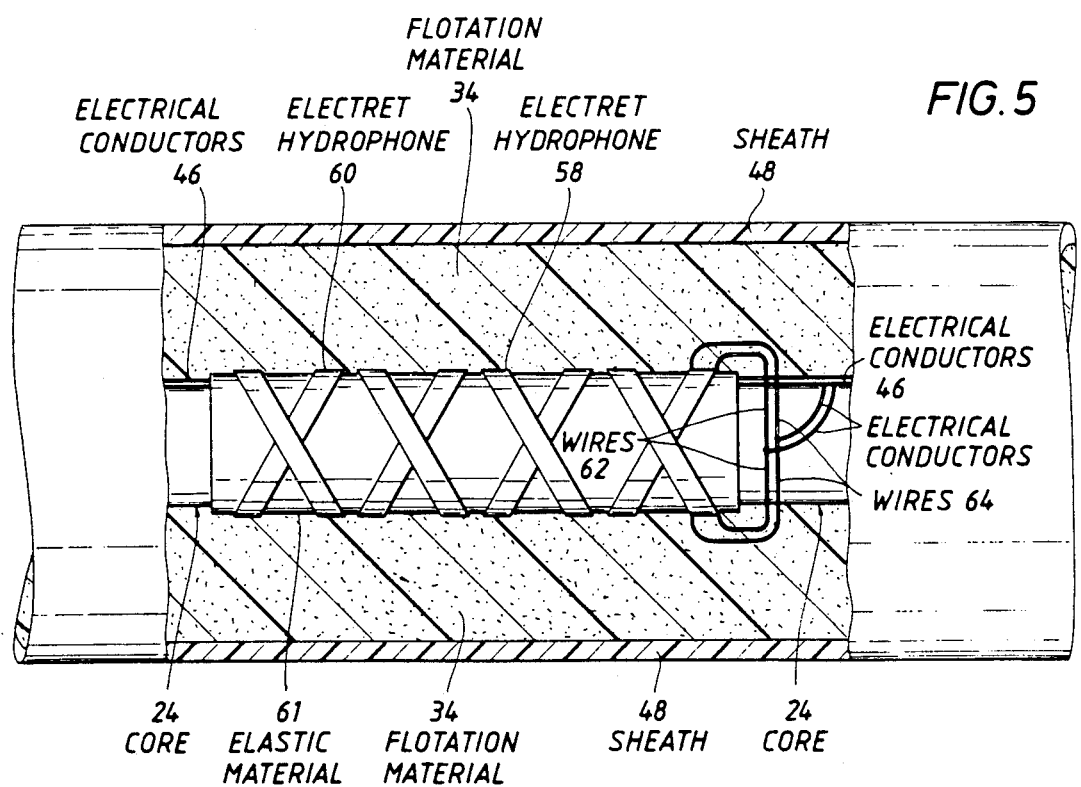
FIG. 5 is a sectional view in side elevation of a third embodiment of the present invention employing electret hydrophones wrapped around the cable core.

FIGS. 4 and 5 disclose alternative embodiments of the present invention in which electret hydrophones are employed. The portions of the cable in FIGS. 4 and 5 that are the same as those shown in FIGS. 2 and 3 are indicated by the same numerals. Referring to FIG. 4, a plurality of electret sensors or hydrophones 50 are positioned longitudinally along core 24. A body of elastic material 52 having low bulk compressibility, such as soft urethane having embedded glass or plastic microspheres or balloons, is positioned between each of electret hydrophones 50 to isolate them from noises transmitted along core 24. Electret hydrophones 50 are electrically connected together by means of their wires 54 and 56 which, in turn, are connected to the pair of wires 44 from the set of wires 46 provided by the termination (not shown) of the cable section. FIG. 5 discloses an embodiment in which a plurality of electret sensors or hydrophones 58 and 60 are helically wrapped around core 24 such that they overlap. A body of elastic material 61 is positioned between electret hydrophones 58 and 60 and core 24. Electret hydrophones 58 and 60 are electrically connected together by means of their wires 62 and 64 which, in turn, are connected to the pair of wires 44 from the set of wires 46 provided by the termination (not shown) of the cable section.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A marine seismic cable, comprising:

a central core member;

flotation material disposed around said core member;

a plurality of electret detectors acoustically isolated from and wrapped around said core member such that said electret detectors overlap;

acoustically transparent material disposed around said detectors; and outer sheath member having a fixed diameter disposed around said flotation material and said transparent material.

* * * * *